AUTOMATIC TELEPHONE SYSTEM

Filed Jan. 3, 1955 6 Sheets-Sheet 1

INVENTOR.
PER O. DAHLMAN
BY Brown, Jackson, Boettcher & Dienner
ATTYS.

AUTOMATIC TELEPHONE SYSTEM

Filed Jan. 3, 1955 6 Sheets-Sheet 2

INVENTOR.
PER O. DAHLMAN
BY Brown, Jackson, Boettcher & Dienner
ATTYS.

June 3, 1958 — P. O. DAHLMAN — 2,837,603

AUTOMATIC TELEPHONE SYSTEM

Filed Jan. 3, 1955 — 6 Sheets-Sheet 3

INVENTOR.
PER O. DAHLMAN

BY Brown, Jackson, Boettcher & Dienner

ATTYS.

June 3, 1958 P. O. DAHLMAN 2,837,603

AUTOMATIC TELEPHONE SYSTEM

Filed Jan. 3, 1955 6 Sheets-Sheet 4

INVENTOR.
PER O. DAHLMAN
BY
ATTYS.

AUTOMATIC TELEPHONE SYSTEM

Filed Jan. 3, 1955 6 Sheets-Sheet 5

INVENTOR.
PER O. DAHLMAN
BY Brown, Jackson, Boettcher & Dienner
ATTYS.

| | | | | | |
|---|---|---|---|---|---|
| 1 | | | X | | |
| 2 | | | | X | |
| 3 | | | | | X |
| 4 | | X | X | | |
| 5 | | X | | X | |
| 6 | | X | | | X |
| 7 | X | | X | | |
| 8 | X | | | X | |
| 9 | X | | | | X |
| 0 | X | X | | | |

INVENTOR.
PER O. DAHLMAN
BY Brown, Jackson, Boettcher & Dienner
ATTYS.

United States Patent Office 2,837,603

Patented June 3, 1958

2,837,603

AUTOMATIC TELEPHONE SYSTEM

Per O. Dahlman, Galion, Ohio, assignor to North Electric Company, a corporation of Ohio Application January 3, 1955, Serial No. 479,344

18 Claims. (Cl. 179—18)

The present application relates to relay switching arrangements and more particularly, to a relay switching arrangement for selecting on a coordinate basis a specific line from a plurality of incoming lines, or a specific trunk or connector from a plurality of trunks associated with the levels of a selector.

A fundamental requirement for the proper operation of a telephone system is the accurate selection of a single line from a plurality of lines. This is necessary not only in the extension of a call from a calling subscriber to the desired called party, but in the connection of a single line of a group to a common test position to permit various tests to be performed on a specific line. Such tests, for example, may comprise monitoring the call for indication of trouble on the line, bridge tests, battery tests, foreign voltage tests, dial speed tests and others. In another application, it may be desirable in case of a cable break to apply tone to the line for the rapid identification of the line and the speedy restoration of service. Furthermore, it may be desirable to select one of a group of outgoing trunks or connectors associated with a particular selector level in a simple, yet accurate manner to perform various tests including dialing through the seized connector or trunk.

In the past, certain complex and costly arrangements have been used to provide for the selection of a particular line for these purposes. In one prior art system, the lines are arranged in an array having horizontal rows and vertical columns. A separate relay is associated with each horizontal row and with each vertical column so that a particular line may be seized by the operation of the appropriate horizontal and vertical coordinate selection relays. However, because of the complexity of prior art arrangements, the excessive overall installation and maintenance costs have proven detrimental in a competitive market and further, the large number of components required occupy a prohibitive amount of space in the central office.

The relay switching arrangement of the present invention basically comprises an arrangement of subscriber lines connected to the contacts of two separate groups of relays which are arranged to select the desired subscriber line on a coordinate basis. The individual ones of one group of relays operate to select a particular vertical column in which the desired subscriber line appears, and the second group is arranged so that by the operation of one relay or a combination of the relays, in that group, the horizontal row in which the desired subscriber line appears is chosen. In the selection of the particular relay or combination of relays two groups of keys are provided. One group of keys (the tens keys) controls the vertical coordinate selection relays to select the particular vertical column in which the desired subscriber line appears. The second group of keys (the units keys) is arranged to select the particular relay, or combination of relays, of the horizontal coordinate selecting group to pick out the horizontal row in which the desired subscriber line appears. Through the contacts of both groups of selecting relays, the specific subscriber line is marked and extended to a test circuit over which the previously described tests may be applied.

More specifically, the subscriber lines of the office are multiplied in groups of one hundred lines to the relay switching arrangement, and are subdivided into five subgroups of twenty lines having four subscriber lines in each vertical row and five subscriber lines in each horizontal row. In each of the five subgroups, a particular vertical coordinate selection relay marks four out of the twenty lines to be extended to the test position. The horizontal coordinate selection relays operate either individually or in combination to select the one out of the four lines marked by the vertical coordinate selection relay, and as selected, extend this single line to the test position.

As an additional feature of the present invention, an arrangement is made to mark one out of a plurality of trunks individually associated with the levels of a particular selector, and to extend the selected trunk over the contacts of vertical and horizontal coordinate selection relays to the test position. For the selection of a particular trunk, one of the "units" keys is arranged to operate in conjunction with a trunk key to energize both the vertical and horizontal coordinate selection relay groups in the marking of the desired trunk, and extension thereof to the test position.

It is an object of the present invention to provide a relay switching arrangement in which the mounting space required for the components is greatly reduced in comparison to that required for prior art installations.

It is another object of the present invention to provide a relay switching arrangement in which one relay of a group may be operated to provide selection of a particular coordinate, and a group of relays may be operated either singly or in combination to provide selection of a second coordinate.

It is yet a further object of the present invention to provide a novel selection arrangement for connecting a test line to one of a group of lines to be tested.

It is a further object of the present invention to provide a novel selection arrangement for connecting a test line to a single one of a plurality of outgoing levels of a selector switch.

These and other advantages and features of the novel relay switching arrangement will become apparent with reference to the following specifications, claims and drawings in which:

Figure 1:
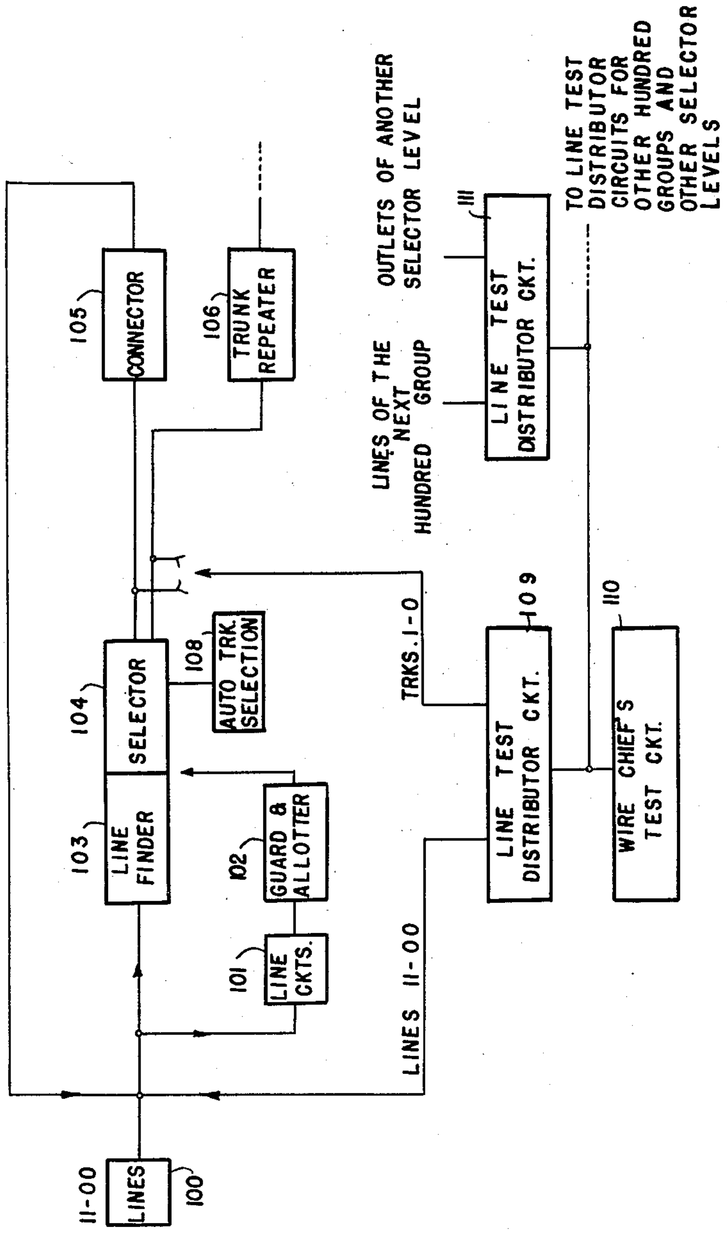
Figure 1 is a schematic representation in block diagram form of an environment in which a plurality of lines is connected to a relay switching arrangement of the present invention for the selection of a particular one of these lines.

To best illustrate the utility of the relay switching arrangement of the present invention, an illustrative environment as shown in Figure 1 shows the relay switching arrangement used to select a particular line out of a group of one hundred lines, and connecting that line to a wire chief's test circuit from which the various tests previously discussed may be selectively applied to the chosen line. In addition, a specific trunk from a plurality of ten trunks, each individually associated with a particular level of a selector, may be marked and extended to the test position by the relay switching arrangement.

In Figure 1 the group of one hundred lines (11–00) is terminated in a block 100. These lines are multipled to the appropriate line circuits 101 which function to connect each particular calling subscriber line through appropriate guard and allotter circuits 102 to an idle one of a group of accessible line finders and selector links, such as the illustrated line finder and selector link 103, 104. Specifically, as the calling subscriber removes his handset from the associated substation, line circuit 101 operates with the guard and allotter circuit 102 to select an idle link, such as 103, 104. The line finder 103 of the link then finds the calling line and extends the connector into the link. The guard and allotter circuit 102 is dropped and dial tone is extended back to the calling subscriber. As the calling party now dials the first digit, the selector 104 which is tied directly to the line finder responds to the incoming impulses of the first digit to choose the particular level in the selector which corresponds to the first digit dialed. As shown in Figure 1 certain levels of selector 104 have access to a connector such as that illustrated in block 105, and other levels have access to a trunk repeater such as the illustrated repeater 106. In accordance with the conventional practice, if the desired called subscriber line is within the one hundred lines terminating at block 100 which are accessed over connector 105, the selector 104 will be operated by the impulses to extend the connection over the level having access to connector 105. Alternatively, if the calling subscriber desires to reach a called party in a distant exchange, the digit dialed must correspond to the level in the selector which has access to a trunk repeater, such as 106, which has access over associated trunks to the distant exchange.

As the appropriate level is seized, a trunk selection circuit 108, common to the calling group of selectors, such as illustrated selector 104, selects an idle one of the groups of connectors or trunk repeaters which are accessible thereover. If a connector has been seized, two or more digits dialed into the seized connector will effect routing of the call to the called line in the conventional manner. On trunk calls, succeeding digits are repeated over the outgoing trunk to the switching equipment in the distant exchange.

The one hundred subscriber lines (11–00) and ten levels (1–0) of the illustrated selector 104 are multipled to the line test distributor circuit 109, which in turn is coupled to a wire chief's test circuit 110 for the purpose of selecting a particular one of the lines, or selector levels, and extending it to the wire chief's test circuit for testing purposes. Other line test distributor circuits, such as 111, are connected to the same wire chief's test circuit 110 so that the particular lines or selector levels of subsequent one hundred line groups or selectors may be selected and coupled to the wire chief's test circuit in a like manner. It may be readily seen that the line test distributor circuit arrangement of the present invention is extremely flexible in that a single wire chief's test circuit may be utilized with any number of incoming lines by merely adding additional line test distributor circuits in the described manner.

Figure 2:
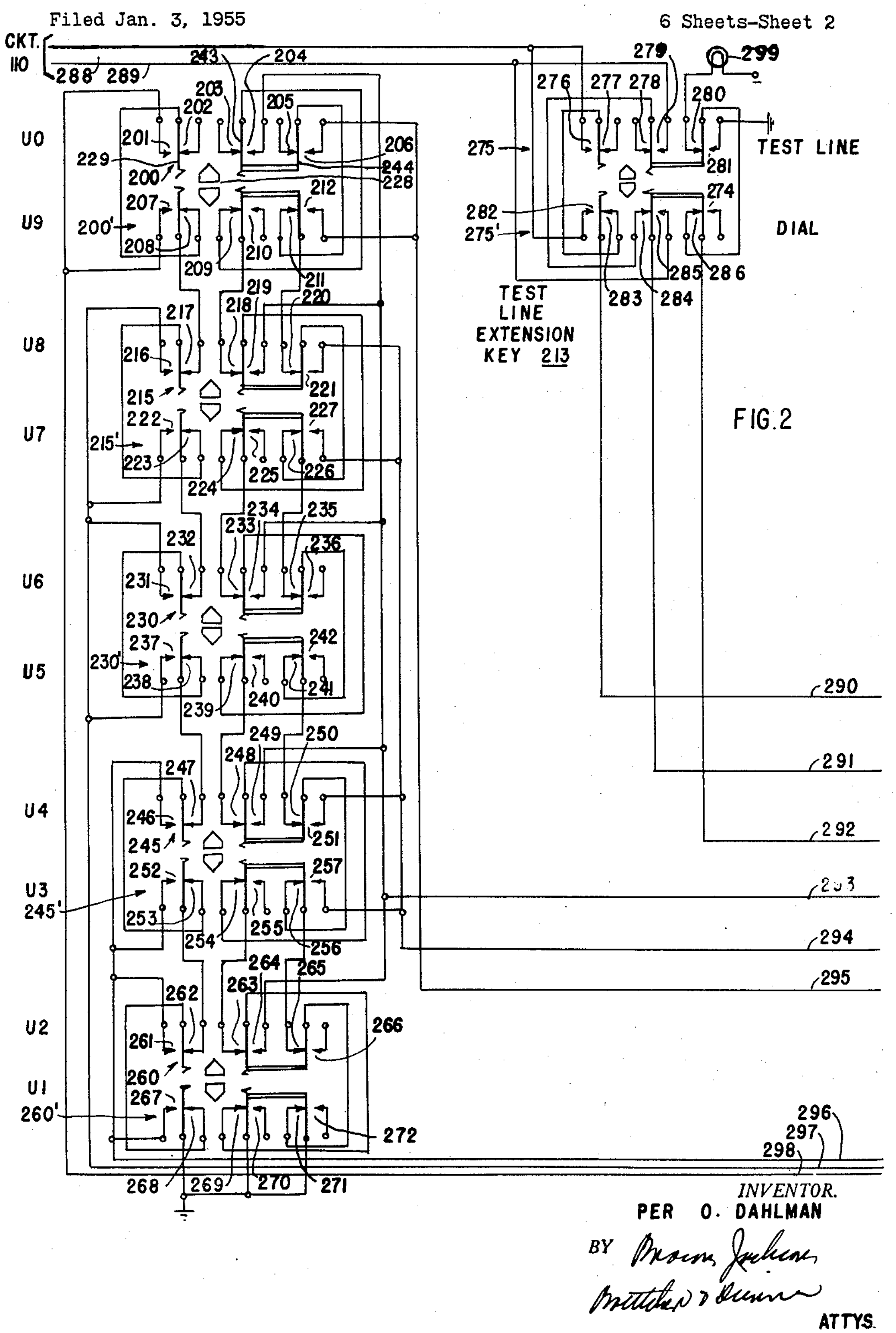
Figures 2–5 are schematic diagrams of one embodiment of the relay switching arrangement of the present invention.
Figure 3:
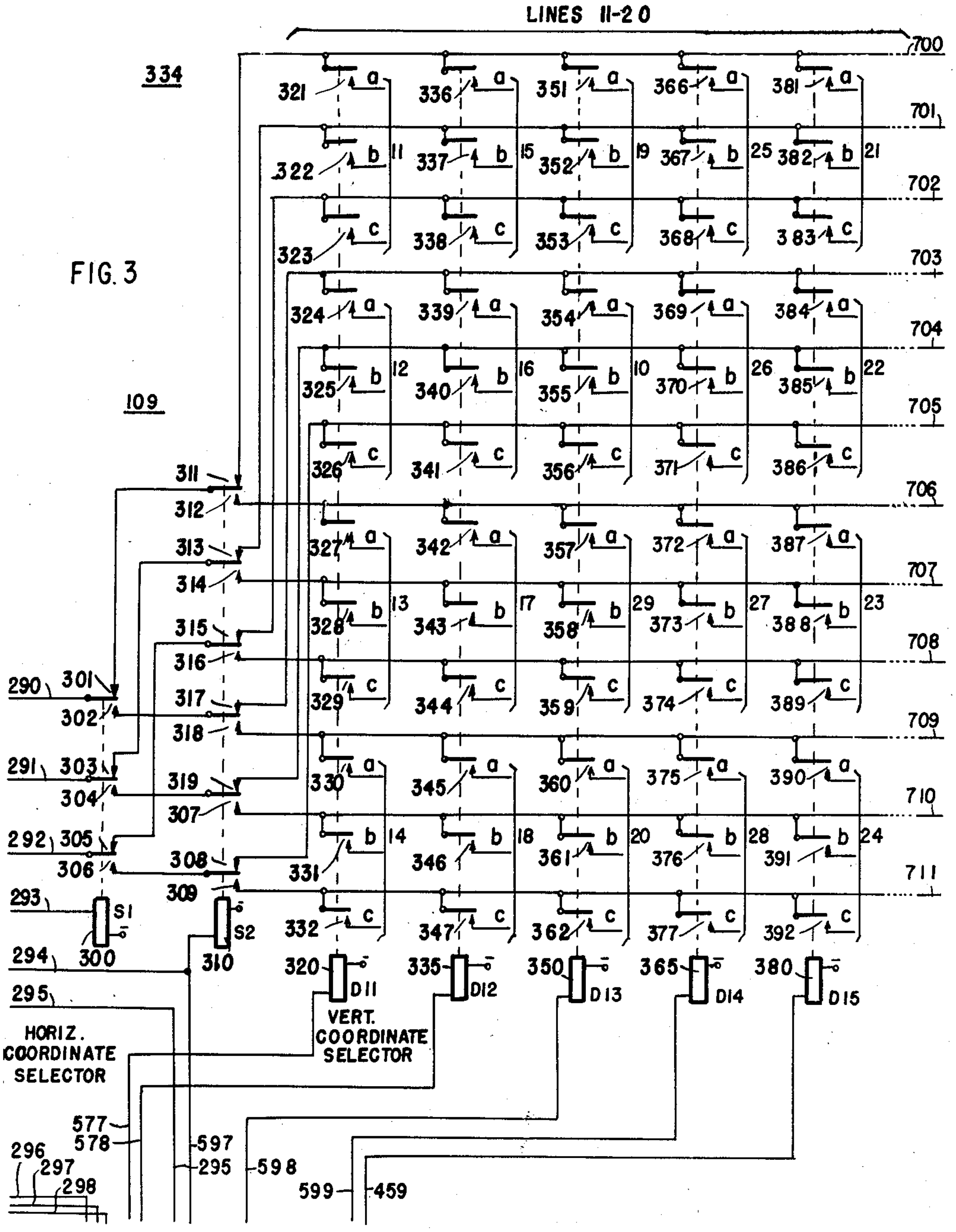

The details of the relay switching arrangement for use as a line test distributor circuit illustrated as block 109 in Figure 1, are shown in Figures 2–5. In general, the figures illustrate a coordinate arrangement for selecting one of one hundred lines, or ten trunk circuits. The one hundred subscriber lines (11–00) connected to the line test distributor circuit 109 are grouped in units of twenty lines (11–20, 31–40, 51–60, 71–80, 91–00), each unit constituting a subgroup, and each subgroup being under the control of five vertical coordinate selection relays and two horizontal coordinate selection relays. Each of the subscriber lines comprises three leads ("+," "—" and P or test leads, herein shown as *a*, *b* and *c* respectively), each lead being separately connected to one contact of a twelve contact relay designated a vertical coordinate selection relay. For purposes of explanation selection of one line of the subgroups of twenty lines 11–20 as illustrated in Figure 3 will be considered, although it is apparent that the other subgroups of twenty lines 31–40, 51–60, 71–80 and 91–00 are similarly arranged, and the discussion with reference to lines 11–20 applies to any one of the other groups of lines. The specific energizing circuits for the horizontal and vertical coordinate selection relays will be described in greater detail hereinafter.

ARRANGEMENT OF SUBGROUPS OF SUBSCRIBER LINES

Lines 11–14 are arranged in the first vertical row of relay coordinate subgroup 334 and are simultaneously marked under the control of the first vertical coordinate selection relay 320; lines 15–18 are arranged in the second vertical column of relay arrangement 334 and are simultaneously marked under the control of the second vertical coordinate selection relay 335; lines 19, 10, 29 and 20 are arranged in the third vertical column and are simultaneously marked under the control of the third vertical coordinate selection relay 350; lines 25–28 are arranged in the fourth vertical column and are simultaneously marked under the control of the fourth vertical coordinate selection relay 365; and the lines 21–24 are arranged in the fifth vertical column and are marked under the control of the fifth vertical coordinate selection relay 380.

The following chart illustrates in graphical form the arrangement of the subgroup of twenty lines 11–20 in accordance with their location in the relay switching arrangement 334.

*Chart I*

| | | | | |
|---|---|---|---|---|
| 11, | 15, | 19, | 25, | 21 |
| 12, | 16, | 10, | 26, | 22 |
| 13, | 17, | 29, | 27, | 23 |
| 14, | 18, | 20, | 28, | 24 |

The coordinate selection system of the present invention is based upon the above arrangement of the subgroup of twenty lines in the one hundred line group. As previously explained, the vertical columns are under the control of vertical coordinate selection relays 320–380. Hence the operation of any one of these five vertical coordinate selection relays results in the marking of each of the three conductors associated with the particular four of the twenty lines associated with the relay and prepares for their extension through the contacts of the horizontal coordinate selection relays 300 and 310.

HORIZONTAL LEVEL SELECTION

The first and second horizontal coordinate selection relays 300 and 310 are arranged to select a particular horizontal level of relay arrangement 334, and operate in conjunction with the appropriate vertical coordinate selection relay to select a particular one of the twenty lines appearing in relay arrangement 334. Upon selection, the particular one of the twenty lines of relay arrangement 334 has its three leads extended to test line extension key 213 which in turn may extend the "+" and "—" lines of the selected line to the wire chief's test circuit 110 over conductors 288 and 289.

The operation of the horizontal coordinate selection relays 300 and 310 is under the control of double throw-keys 200, 215, 230, 245 and 260 illustrated in Figure 2. Each of the five "units" keys has two positions, and the arrangement of the keys is such that the contacts operated at each position are associated with a particular "units" digit. One position of each key is designated by the appropriate one of the above numbers while the alternate position is designated by the same number with a prime or superscription. For convenience, the positions of the keys are identified as U1–U0.

Since the double throw-keys utilized throughout the illustrated embodiment for controlling the actuation of the vertical and horizontal coordinate selection relays are similar in construction and operation, a description of the structure and operation of a typical key should suffice for purposes of understanding the invention. As an example consider the "units" key having sections 200 and 200', wherein a centrally located actuator 228 having opposed wedging sections is arranged to be operated into an upper or lower position U0 and U9 under the influence of a lever (not shown). Assuming that actuator 228 is moved into one of its positions (the upper one), its wedging section spreads apart the downwardly extending contact carrying members 229 and 243 which have inwardly extending V-shaped portions arranged to slide along the offset faces of actuator 228. A third contact carrying member 244 is mechanically attached to member 243 and is movable therewith. Obviously, as a result of the lateral movement of the contact carrying members 229, 243 and 244, contacts 201, 204, and 206 are made, while simultaneously contacts 202, 203 and 205 are opened.

In its downward, or U9 position actuator 228 opens contacts 208, 209 and 211 and closes contacts 207, 210 and 212 in response to the lateral movement of contact carrying members analogous to members 229, 243 and 244. In its central or rest position the offset surfaces of actuator 238 are out of engagement with any of the contact carrying members and as a result contacts 202, 203, 205, 208, 209 and 211 are closed.

In the preferred embodiment the keys utilized for control of the vertical and horizontal coordinate selection relays are of the locking type wherein they retain their position upon movement. Such an arrangement is unnecessary to the operation of the invention and any type of non-locking key may be used. Additionally, if desired, separate keys may be substituted for each position of the double throw-keys herein illustrated.

Returning now to the general description of the operation of the horizontal coordinate selection relays 300 and 310, it should be noted that the first horizontal coordinate selection relay 300 is operative in conjunction with the contacts of sections U2, U4, U6, U8 or U0 and the second horizontal coordinate selection relay 310 is arranged to be operative over either one of two separate paths. The first path operates the relay directly in conjunction with sections U3, U4, U7 or U8. The second path energizes second horizontal selection relay 310 by the cooperation of the contacts of sections U9 and U0 and the appropriate contacts of sections T20, T40, T60, T80 and T00 of keys 500–580 respectively.

Since it is by the application of ground to the windings of the horizontal coordinate selection relay or relays that these relays are operated, the contacts of the "units" keys are so wired that ground is applied over the contacts of the operated key section through the normally closed contacts of lower numbered positions. As a specific example, if key 245 is thrown to its U4 position, contacts 247, 248 and 250 are opened and contacts 246, 249, and 251 are closed. Key section U4 at its contacts 247, 248 and 250 opens the ground circuit to the contacts of those key sections corresponding to higher "units" digits for rendering them ineffective; at its contacts 249 and 251, key section U4 applies ground to complete energizing circuits for first and second horizontal coordinate selection relays 300 and 310 over circuits to be described in greater detail hereinafter. At its contacts 246, key section U4 extends ground to complete an energizing circuit for the operation of either the first vertical coordinate selection relay 320 or the fifth vertical selection relay 380 through the contacts 508 or contacts 507 and 516 respectively, of key 500 (depending upon whether key 500 is thrown to its T10 or T20 position).

In the above example, first and second horizontal coordinate selection relays 300 and 310 are operated and at their contacts 302, 304 and 306, and 318, 307 and 309 respectively prepare to extend the three common conductors 709, 710 and 711 of the lowest horizontal level to the test circuit 110. In the above example, either the first or fifth vertical coordinate selection relay is operated to extend the three conductors of lines 14 or 24 to the common conductors 709, 710 and 711. The final selection of the vertical column in which the desired subscriber line appears is under the control of "tens" key 500, and is determined by the operation of this key to either its T10 or T20 position.

By an analogous analysis of the effect of the operation of key sections U1–U3 and U5–U8 it may be seen that the particular horizontal level desired may be selected through the operation of the appropriate "units" key which operates the single one or combination of the horizontal coordinate selection relays 300 and 310 to select a horizontal level corresponding to the "units" digit of the incoming line.

Since each of the "units" digits 1–8 appears in only one given horizontal level, the operation either singly or in combination of horizontal coordinate selection relays for selection of the subscriber lines having those "units" digits may be predetermined and the contacts of the corresponding "units" key sections may be arranged to so operate them.

However, as may be seen from an inspection, lines containing each of the "units" digits 9 and 0 appear in two different horizontal levels and an alternative arrangement has been provided to select the horizontal level desired, determined by the "tens" digit as well as by the "units" digit. The contacts 206 of "units" key section U0, for example, over which ground is applied to operate the second horizontal coordinate selection relay, are connected to the contacts of key 500 in such a way that upon the operation of section T10, key 500 at its contacts 502 interrupts the energizing circuit for the second horizontal coordinate selection relay 310 and relay 310 is rendered inoperative. Relay 310 at its contacts 311, 313, 315, 317, 319 and 308 extends the three common leads 700–705 of each of the upper two horizontal levels to the contacts of the first horizontal coordinate selection relay 300. Alternatively, if key 500 is thrown to its T20 position, key 500 at its contacts 509 is effective to complete the energizing circuit of second horizontal coordinate selection relay 310 to ground through contacts 206 and 502. Relay 310 operates and at its contacts 312, 314, 316, 318, 307 and 309 extends the six conductors 706–711 of each of the lower two horizontal levels to the contacts of the first horizontal coordinate selection relay for further extension to the test circuit.

It will be recalled that the first horizontal coordinate selection relay 300 is operated by key section U0. Relay 300 at its contacts 302, 304 and 306 extends the three conductors of either line 10 or 20 to test circuit 110 depending upon whether or not second horizontal coordinate selection relay 310 is operated under the control of key sections T10 or T20 of "tens" key 500.

A similar analysis will apply to the selection of either line 19 or 29 under the control of key sections U9 and T10 or T20.

VERTICAL COLUMN SELECTION

The five vertical coordinate selection relays (320–280) are under the control of sections T10 and T20 of key 500 which in conjunction with the contacts of the appropriate "units" key completes an operating circuit for the particular vertical coordinate selection relay having control over the vertical column in which the line with the desired "tens" unit appears.

Each of the vertical coordinate selection relays is arranged to be operative only through the joint cooperation of the contacts of the "tens" and "units" keys. Thus, if the desired line has the digit 1 as the "tens" digit, a double-throw "tens" key is operated to the "10" position, and those vertical coordinate selection relays associated with subscriber lines having a "tens" digit "1" are prepared for energization. Upon operation of the "units" key having the desired "units" designation, the energizing circuit of that vertical coordinate selection relay associated with the vertical column in which the desired subscriber line appears is completed through the contacts of that portion of the double-throw key associated with the "units" digit of the desired line. The circuits for the other vertical coordinate selection relays associated with the vertical columns not containing the subscriber line with the desired "units" digit are not energized.

As will become apparent later, the contacts of relays T10 and T20 not only provide an operating path for the relays under their control, but also provide an operating path for the vertical coordinate selection relays of the other relay switching arrangements for lines 31–00.

The operation of the relay arrangements for the selection of lines 31–00 is similar to that discussed in general with respect to the relay arrangement 334 for the selection of a particular one of the twenty lines 11–20. In this case, the "tens" key associated with the vertical coordinate selection relay which controls the vertical column in which the desired line appears is operated, and through the contacts of this key, and the normally closed contacts of lowered numbered "tens" keys, an operating circuit is energized for the vertical coordinate selection relay. In the manner previously discussed, the horizontal coordinate selection relay group is energized under the control of the "units" key to select the horizontal level in which the desired line appears.

SELECTOR LEVEL SELECTION

Reference is now made to the selection of a particular trunk associated with a level of the calling selector. It should be recalled that in the conventional selector, there are ten levels available for the extension of calls to either local subscribers or to distant exchanges depending upon the arrangement provided. If it is desired to select one of the levels so as to make a test upon an outgoing trunk, the arrangement in Figure 4 utilizing vertical coordinate selection relays 475, 490, and 413 is provided. The operation of the desired vertical selection relay is under the control of the TK key 517 (illustrated in Figure 5) and over the contacts of "tens" keys 500, 520, 540, 560 and 580 in addition to the contacts of the appropriate "units" key. The operation of the horizontal coordinate selection relay group is under the control of the proper "units" key (U1—U0) in the manner discussed with reference to the selection of a horizontal level is subscriber lines.

SEIZURE OF A SPECIFIC SUBSCRIBER LINE

A specific example showing the seizure of a desired line is now set forth to more clearly illustrate the operation of the embodiment of the relay switching arrangement of the present invention. It is assumed as an example that line "14" out of the one hundred lines terminating in block 100 is desired. In order to select this line "tens" key 500 is thrown to its position T10, and "units" key 245 is operated to position U4.

Considering first the nature of the operation accomplished with the operation of "tens" key T10, it will be apparent that key 500 at its contacts 502, 504, 505 and 507, opens a multiple circuit which extends to the subsequent keys 520, 540, 560, 580, and 517, to prevent false or unwarranted operation of the vertical coordinate selection relays associated with lines 31–00 or trunks T1–T10.

Section T10 at its contacts 502 interrupts a point in the operating circuit for the second horizontal control relay 310 as controlled by units key 200 (U9, U0) in cooperation with the "T" contact sets, T20, T40, T60, T80 and T00; at its contacts 503 prepares an operating circuit for the third vertical coordinate selection relay 350 controlled by "units" key positions U0 and U9 respectively; at its contacts 504 interrupts control of the subsequent third vertical coordinate selection relays D23, D33, D43, and D53 by the subsequent key sets T20–T00; at its contacts 505 interrupts control of the subsequent fourth vertical coordinate relays D24, D34, D44 and D54 by the subsequent key sets T20–T00; at its contacts 506 prepares an operating circuit for the second vertical coordinate selection relay 335 as controlled by "units" key positions U5–U8; at its contacts 507 interrupts control of the fifth vertical coordinate relays D25, D35, D45 and D55 by the subsequent key sets T20–T00; and at its contacts 508 prepares an operating circuit for the first vertical coordinate selection relay 320 as controlled by "units" key positions U1, U2, U3, U4. Consequently, the vertical coordinate selection relays 320, 335, and 350 are prepared under the control of the contacts of sections U1—U0 for selection of ten out of the twenty lines of the subgroup under the control of each "tens" key.

Units key section U4 is then manually operated and at its contacts 246 extends ground to energize the first vertical coordinate selection relay 320, the first horizontal coordinate selection relay 300, and the second horizontal coordinate selection relay 310. At its contacts 247, 248 and 250, section U4 opens the path to ground for the higher numbered key sections; at its contacts 249, section U4 prepares an energizing circuit for the first horizontal coordinate selection relay 300 and at its contacts 251, prepares an energizing circuit for the second horizontal coordinate selection relay 310. Relay 320 is energized over the following path: battery, through the winding of relay 320 over conductor 577, contacts 508, conductor 296, contacts 246, contacts 253, contacts 262 and contacts 268 to ground.

First vertical coordinate selection relay 320 operates, and at its contacts 321–323 prepares a circuit for the extension of the three wires associated with line 11, through the contacts of the first and second horizontal coordinate selection relays 300 and 310 to the test line extension key 213; at its contacts 324–326 prepares a circuit for the extension of the three wires of line 12 to the test line extension key 213; at its contacts 327–329 prepares for the extension of the three wires associated with line 13 to test line extension key 213; at its contacts 330–332 prepares for the extension of the three wires associated with line 14 to the test line extension key 213.

The conductors may be extended to the wire chief's test circuit 110 over conductors 288 and 289 as described more fully hereinafter. At this point, four of the twenty lines of the first subgroup have been selected.

Second horizontal coordinate selection relay 310 is energized responsive to the operation of section U4 of "units" key 245 over the following path: battery, through the winding of relay 310, over conductor 294, contacts 251, 256, 265, 271, and thence to ground. Relay 310 operates and at its contacts 312, 314 and 316 prepares to extend the three wires of the third level to the test line extension key 213, and at its contacts 318, 307, and 309 prepares to extend the three wires of the fourth level to the test line extension key 213; at its contacts 311, 313 and 315, relay 310 interrupts extension of circuit for the three wires of the first level, and at its contacts 317, 319, and 308 interrupts extension of the three wires of the second level. At this point, two of the four subscriber lines previously selected under the control of the first vertical coordinate selection relay are marked for extension to the contacts of the first horizontal coordinate selection relay 300.

The first horizontal coordinate selection relay 300 is energized responsive to operation of key 245 to position U4 over the following path: battery, through the winding of relay 300, over conductor 293, contacts 249, contacts 254, contacts 263, contacts 269, and thence to ground. The first horizontal coordinate selection relay 300 at its contacts 301, 303, and 305, interrupts the extension circuit for the three wires associated with the third level; and at its contacts 302, 304, and 306, extends the three wires associated with line 14 to the test line extension key 213 over conductors 290, 291 and 292.

If the selected line (line 14 in the present example) is busy, its P-wire is grounded and busy indicating lamp 299 is lighted over the following path: battery, through the filament of lamp 299, over contacts 280, 286, conductor 292, contacts 306, contacts 309, contacts 332, and over the P-wire *c* of the selected line 14 to ground. Lamp 299 is utilized for the purpose of indicating to the wire chief that the line is busy and he may, if he so desires, monitor the line. If lamp 299 is not lighted, it is an indication that the selected line is not busy.

The selected line extended to test line extension key 213 over conductors 290–292 may be prepared for monitoring, or for dialing inward depending upon whether key 213 is thrown to the "test line" position or to the "dial" position. If key 213 is thrown to the "dial" position contacts 283, 284 and 286 are opened and contacts 274, 285 and 282 are closed in the manner previously described relative to "units" key 200. In this position contacts 282 are closed to extend the positive wire *a* of line 14 to the ground side of the wire chief test circuit 110 over the following path: "+" wire *a* over contacts 330, contacts 318, contacts 302, conductor 290, contacts 282 and conductor 288 to "+" or ground side of the wire chief's test circuit 110. Key 213 at its contacts 285 connects the "−" lead *b* of selected line 14 to the battery side of the wire chief's test circuit 110 over the following path: "−" wire *b* over contacts 331, contacts 307, contacts 304, conductor 291, contacts 285, and conductor 289, to the battery side of the wire chief's test circuit. Key 213 at its contacts 274 connects the test wire *c* of line 14 to an open circuit in the dial section of the test line extension key 213 over the following path: wire *c*, over contacts 332, contacts 309, contacts 306, conductor 292, and contacts 274, which then places the P-wire on the open line. Test line extension key 213 at its contacts 286 opens the circuit to the busy lamp 299 which is extinguished, if lighted. Dialing may now take place out over the line.

After the three wires of the selected line have been marked through the cooperative action of the horizontal coordinate selection relay group and the energized vertical coordinate selection relay, tests may be performed on the line through the use of the test line position of the test line extension key 213. Upon the operation of the test line extension key 213 to the "test line" position, key 213 closes contacts 276, 279, and 281 and opens contacts 277, 278 and 280. Key 213 is effective at its contacts 276 to connect the positive lead *a* of the selected line to the wire chief's test circuit over the following path: line *a*, over contacts 330, contacts 318, contacts 302, conductor 290, contacts 283, contacts 276, and over conductor 288 to the positive or tip lead of the wire chief's test circuit. Key 213 at its contacts 277 and 278 interrupts the open circuit termination on the extended "+" and "−" leads of the selected line, and at its contacts 279, extends the negative lead *b* to the ring side of the wire chief's test circuit over the following path: wire *b* over contacts 331, contacts 307, contacts 304, conductor 291, contacts 284, contacts 279, and conductor 289 to the battery side of wire chief's test circuit. Key 213 at its contacts 280 opens the energizing circuit for the busy indicating lamp 299, and at its contacts 281 applies ground to the test lead of the selected line to indicate in the connector multiple circuits of the switchboard that the selected line is busy, such path extending from test wire *c* over contacts 332, contacts 309, contacts 306, conductor 292, contacts 286, and contacts 281 to ground. Consequently, at this point the three leads of the selected line have been extended through the test line extension key 213 in such a manner that the positive and negative conductors of the selected line are connected to the tip and ring lines of the wire chief test circuit respectively, and the test wire is connected to ground to indicate a busy condition on the selected lead. The wire chief then has access over the selected line to perform the various tests previously described.

TRUNK SELECTION

Figure 4:
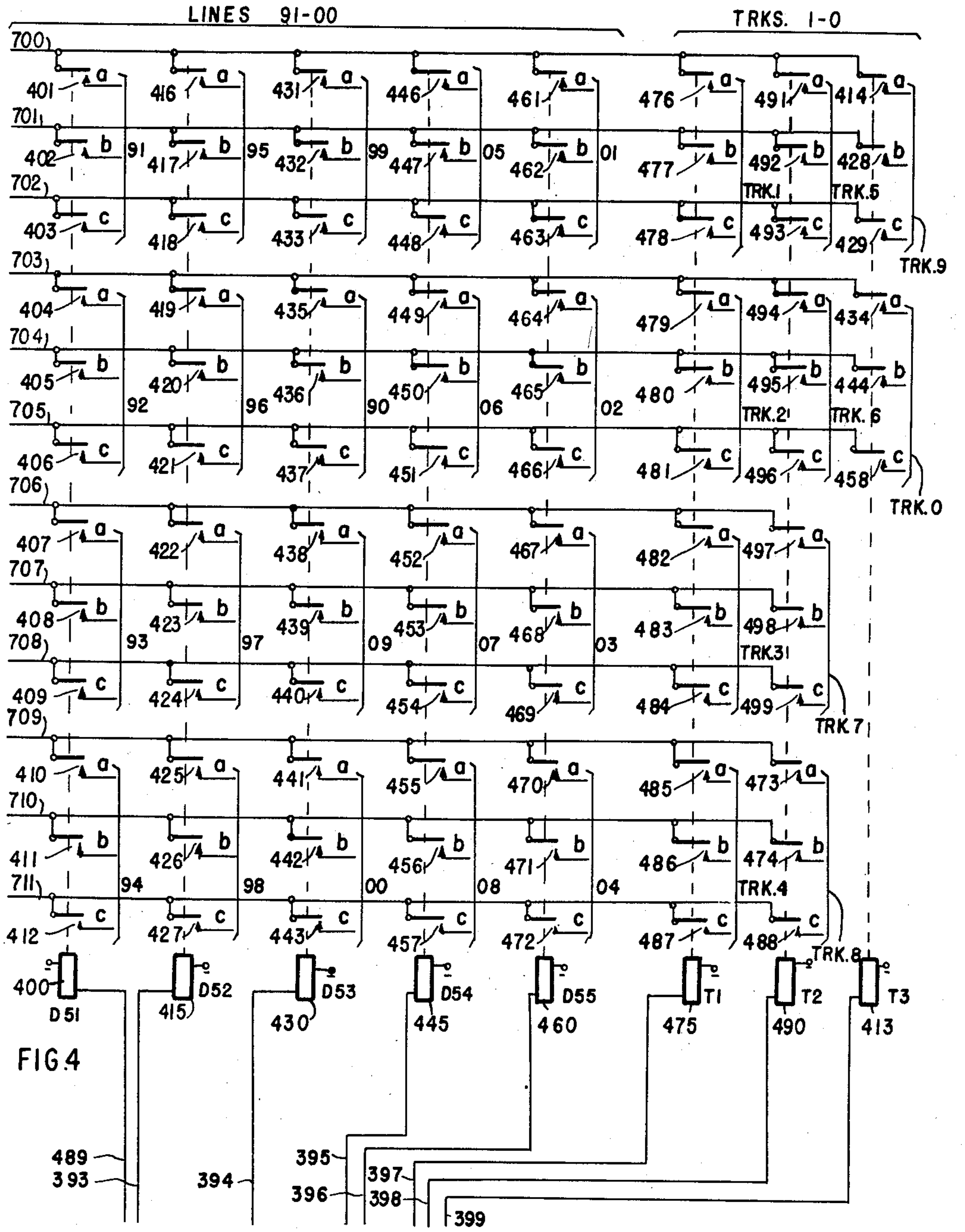
Figure 5:
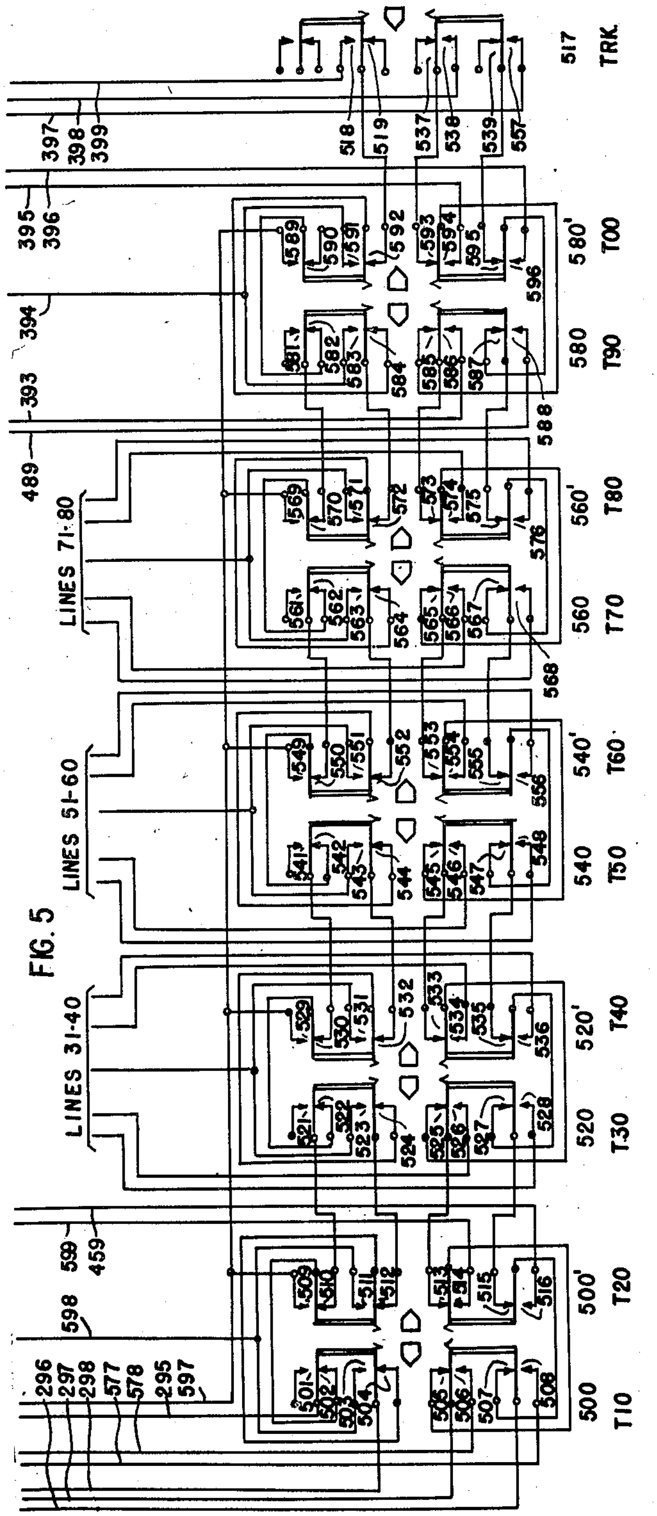
Figure 8:
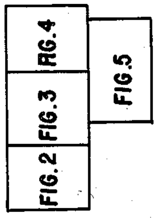
Figure 8 is a block diagram illustrating the interconnection of Figures 2–5.

The leads marked TRKS. 1–0 are connected to the ten available levels of the selector 104 so that tests may be made on the outgoing line through either the connected or the trunk repeater connected to the selected level. With reference to Figure 4, three vertical coordinate selection relays 475, 490 and 413 are utilized in effecting selection of the desired trunk lines. These relays operate under the control of the trunk key 517 in a manner similar to that described with reference to the first three vertical coordinate selection relays 320, 335 and 350 of Figure 3. In this fashion the vertical column in which the desired trunk appears is selected, and the horizontal row in which the desired trunk appears is selected through the cooperative action of the horizontal coordinate selection relays 300 and 310.

In general, the first vertical coordinate selection relay 475 is under the control of "units" key sections U1, U2, U3 and U4 over the contacts of trunk key 517 and the contacts of "tens" keys 500–580. The second vertical coordinate selection relay 490 is under the control of the "units" key sections U5–U8 through the contacts of the "tens" selection keys 500–580 and the contacts of trunk key 517. The third vertical coordinate selection relay 413 is under the control of "units" key sections U9 and U0 through the contacts of trunk key 517 and the "tens" keys 500–580. The selection of the horizontal row in which the desired trunk appears is under the control of the "units" key section corresponding to that trunk number in the same manner that the horizontal row selection of the subscriber lines is accomplished. In this latter application it is necessary merely to throw the "units" key having the appropriate digit and the trunk key 517 in order to select the one of the ten trunks available to the relay selection arrangement.

Specifically if it is desired to select trunk "three," trunk key 517 is thrown to extend the operating leads of the vertical coordinate selection relays 475, 490 and 413 over the contacts of keys 500–580 to the keys U1–U0. The "units" key section U3 is thrown to an operative position and the three wires (*a*, *b*, and *c*) of trunk "three" are extended to the test line extension key 213 and thence over appropriate conductors to the wire chief's test circuit.

Specifically trunk key 517 is operated, and at its contacts 557 extends the energizing circuit for the first vertical coordinate selection relay 475 over the contacts of keys T10–T00 to the contacts of the "units" keys associated with positions U1, U2, U3, U4; at its contacts 538 prepares an operating circuit for the second vertical coordinate relay 490, and at its contacts 518, prepares an energizing circuit for the third vertical coordinate selection relay 413.

Upon the manual operation of "units" key section U3, contacts 253, 254 and 256 are opened and contacts 252, 255 and 257 are closed. Key 245 at its contacts 253, 254 and 256, interrupts the ground circuit to contacts of higher numbered "units" key sections; at its contacts 257, prepares an energizing circuit for the second horizontal coordinate selection relay 310, and at its contacts 252, prepares an energizing circuit for the first vertical coordinate selection relay 475 over the following path; battery, the winding of relay 475, conductors 397, contacts 557, contacts 595, contacts 587, contacts 575, contacts 567, contacts 555, contacts 547, contacts 535, contacts 527, contacts 515, contacts 507, conductor 296, contacts 252, contacts 262, contacts 268, and thence to ground.

Relay 475 operates, and at its contacts 476, 477, and 478 extends the three wires of trunk 1 toward the contacts of the horizontal coordinate selection relays 300 and 310; at its contacts 479, 480 and 481 extends the three wires of trunk 2 to the contacts of the horizontal coordinate selection relays 300 and 310; at its contacts 482, 483, and 484 extends the three wires of trunk 3 to the contacts of horizontal coordinate selection relays 300 and 310, and at its contacts 485, 486 and 487 extends the three wires of trunk 4 to the contacts of the horizontal coordinate selection relays 300 and 310. The selection is thus narrowed to four trunks of ten.

Upon the operation of "units" key section U3, the second vertical coordinate selection relay 310 is energized over the following path: battery, through the winding of relay 310, over conductor 294, contacts 257, contacts 265, contacts 271, and thence to ground.

Relay 310 operates and at its contacts 311, 313, 315, 317, 319 and 308 interrupts the circuits extending over conductors 700–705 respectively to the three wires of trunks 1 and 2; at its contacts 312, 314, and 316, extends the three wires of trunk 3 over contacts 482–484 and conductors 706–708 respectively, to the contacts 301, 303, and 305 of the first horizontal selection relay 300; and at its contacts 318, 307 and 309 prepares a point in the extension circuit for the three wires of trunk 4.

Since the first horizontal coordinate selection relay 300 is restored, contacts 301, 303 and 305 are closed and extend the three wires (*a*, *b*, and *c*) of trunk 3 over conductors 290, 291 and 292 respectively to the test line extension relay key 213. It will be recalled that until the test line extension key 213 is operated, the positive and negative wires of the selected line or trunk are terminated in an open circuit, and that the busy lamp 299 is lighted over the test wire of the selected line or trunk to indicate a busy condition.

As previously described the operation of test line extension key 213 permits the further extension of the wires *a*, *b*, and *c* of the selected trunk to the wire chief's test circuit and enables him to test outwardly over either a connector or trunk repeater.

The operation of the selection arrangement for selecting a particular trunk is similar in operation to that explained with reference to the selection of a single line of a plurality of lines. The major difference lies in the fact that for trunk selection only ten trunks are conventionally encountered, and that the basic subgroup of twenty lines is now reduced to ten. However, the basic selection principle remains the same.

Reference to the following chart may be made to determine the appropriate key or keys to be operated for the selection of a particular line out of one hundred lines, or the selection of a particular trunk out of ten trunks. The chart also illustrates the relays which are operated in response to the operation of the desired key. For purposes of simplicity, the three digit designations of the horizontal coordinate selection relays have been changed from 300 and 310 to S1 and S2. Additionally the designation of the vertical coordinate selection relays appear as D11–D55 in which the first digit of the subscription indicates the sequence of subgroups and the second digit, the vertical column of the subgroup with which the designated relay is associated.

*Chart II*

| Lines | Keys | | Relays | | | Lines | Keys | | Relays | | |
|---|---|---|---|---|---|---|---|---|---|---|---|
| 11 | T10 | U1 | D11 | ------ | ------ | 61 | T60 | U1 | D35 | ------ | ------ |
| 12 | T10 | U2 | D11 | S1 | ------ | 62 | T60 | U2 | D35 | S1 | ------ |
| 13 | T10 | U3 | D11 | ------ | S2 | 63 | T60 | U3 | D35 | ------ | S2 |
| 14 | T10 | U4 | D11 | S1 | S2 | 64 | T60 | U4 | D35 | S1 | S2 |
| 15 | T10 | U5 | D12 | ------ | ------ | 65 | T60 | U5 | D34 | ------ | ------ |
| 16 | T10 | U6 | D12 | S1 | ------ | 66 | T60 | U6 | D34 | S1 | ------ |
| 17 | T10 | U7 | D12 | ------ | S2 | 67 | T60 | U7 | D34 | ------ | S2 |
| 18 | T10 | U8 | D12 | S1 | S2 | 68 | T60 | U8 | D34 | S1 | S2 |
| 19 | T10 | U9 | D13 | ------ | ------ | 69 | T60 | U9 | D33 | ------ | S2 |
| 10 | T10 | U0 | D13 | S1 | ------ | 60 | T60 | U0 | D33 | S1 | S2 |
| 21 | T20 | U1 | D15 | ------ | ------ | 71 | T70 | U1 | D41 | ------ | ------ |
| 22 | T20 | U2 | D15 | S1 | ------ | 72 | T70 | U2 | D41 | S1 | ------ |
| 23 | T20 | U3 | D15 | ------ | S2 | 73 | T70 | U3 | D41 | ------ | S2 |
| 24 | T20 | U4 | D15 | S1 | S2 | 74 | T70 | U4 | D41 | S1 | S2 |
| 25 | T20 | U5 | D14 | ------ | ------ | 75 | T70 | U5 | D42 | ------ | ------ |
| 26 | T20 | U6 | D14 | S1 | ------ | 76 | T70 | U6 | D42 | S1 | ------ |
| 27 | T20 | U7 | D14 | ------ | S2 | 77 | T70 | U7 | D42 | ------ | S2 |
| 28 | T20 | U8 | D14 | S1 | S2 | 78 | T70 | U8 | D42 | S1 | S2 |
| 29 | T20 | U9 | D13 | ------ | S2 | 79 | T70 | U9 | D43 | ------ | ------ |
| 20 | T20 | U0 | D13 | S1 | S2 | 70 | T70 | U0 | D43 | S1 | ------ |
| 31 | T30 | U1 | D21 | ------ | ------ | 81 | T80 | U1 | D45 | ------ | ------ |
| 32 | T30 | U2 | D21 | S1 | ------ | 82 | T80 | U2 | D45 | S1 | ------ |
| 33 | T30 | U3 | D21 | ------ | S2 | 83 | T80 | U3 | D45 | ------ | S2 |
| 34 | T30 | U4 | D21 | S1 | S2 | 84 | T80 | U4 | D45 | S1 | S2 |
| 35 | T30 | U5 | D22 | ------ | ------ | 85 | T80 | U5 | D44 | ------ | ------ |
| 36 | T30 | U6 | D22 | S1 | ------ | 86 | T80 | U6 | D44 | S1 | ------ |
| 37 | T30 | U7 | D22 | ------ | S2 | 87 | T80 | U7 | D44 | ------ | S2 |
| 38 | T30 | U8 | D22 | S1 | S2 | 88 | T80 | U8 | D44 | S1 | S2 |
| 39 | T30 | U9 | D23 | ------ | ------ | 89 | T80 | U9 | D43 | ------ | S2 |
| 30 | T30 | U0 | D23 | S1 | ------ | 80 | T80 | U0 | D43 | S1 | S2 |
| 41 | T40 | U1 | D25 | ------ | ------ | 91 | T90 | U1 | D51 | ------ | ------ |
| 42 | T40 | U2 | D25 | S1 | ------ | 92 | T90 | U2 | D51 | S1 | ------ |
| 43 | T40 | U3 | D25 | ------ | S2 | 93 | T90 | U3 | D51 | ------ | S2 |
| 44 | T40 | U4 | D25 | S1 | S2 | 94 | T90 | U4 | D51 | S1 | S2 |
| 45 | T40 | U5 | D24 | ------ | ------ | 95 | T90 | U5 | D52 | ------ | ------ |
| 46 | T40 | U6 | D24 | S1 | ------ | 96 | T90 | U6 | D52 | S1 | ------ |
| 47 | T40 | U7 | D24 | ------ | S2 | 97 | T90 | U7 | D52 | ------ | S2 |
| 48 | T40 | U8 | D24 | S1 | S2 | 98 | T90 | U8 | D52 | S1 | S2 |
| 49 | T40 | U9 | D23 | ------ | S2 | 99 | T90 | U9 | D53 | ------ | ------ |
| 40 | T40 | U0 | D23 | S1 | S2 | 90 | T90 | U0 | D53 | S1 | ------ |
| 51 | T50 | U1 | D31 | ------ | ------ | 01 | T00 | U1 | D55 | ------ | ------ |
| 52 | T50 | U2 | D31 | S1 | ------ | 02 | T00 | U2 | D55 | S1 | ------ |
| 53 | T50 | U3 | D31 | ------ | S2 | 03 | T00 | U3 | D55 | ------ | S2 |
| 54 | T50 | U4 | D31 | S1 | S2 | 04 | T00 | U4 | D55 | S1 | S2 |
| 55 | T50 | U5 | D32 | ------ | ------ | 05 | T00 | U5 | D54 | ------ | ------ |
| 56 | T50 | U6 | D32 | D1 | ------ | 06 | T00 | U6 | D54 | S1 | ------ |
| 57 | T50 | U7 | D32 | ------ | S2 | 07 | T00 | U7 | D54 | ------ | S2 |
| 58 | T50 | U8 | D32 | S1 | S2 | 08 | T00 | U8 | D54 | S1 | S2 |
| 59 | T50 | U9 | D33 | ------ | ------ | 09 | T00 | U9 | D53 | ------ | S2 |
| 50 | T50 | U0 | D33 | S1 | ------ | 00 | T00 | U0 | D53 | S1 | S2 |

| Trunk | Keys | | Relays | | |
|---|---|---|---|---|---|
| 1 | TK | U1 | T1 | ------ | ------ |
| 2 | TK | U2 | T1 | S1 | ------ |
| 3 | TK | U3 | T1 | ------ | S2 |
| 4 | TK | U4 | T1 | S1 | S2 |
| 5 | TK | U5 | T2 | ------ | ------ |
| 6 | TK | U6 | T2 | S1 | ------ |
| 7 | TK | U7 | T2 | ------ | S2 |
| 8 | TK | U8 | T2 | S1 | S2 |
| 9 | TK | U9 | T3 | ------ | ------ |
| 0 | TK | U0 | T3 | S1 | ------ |

ALTERNATIVE RELAY SWITCHING ARRANGEMENT

Figures 6, 7:
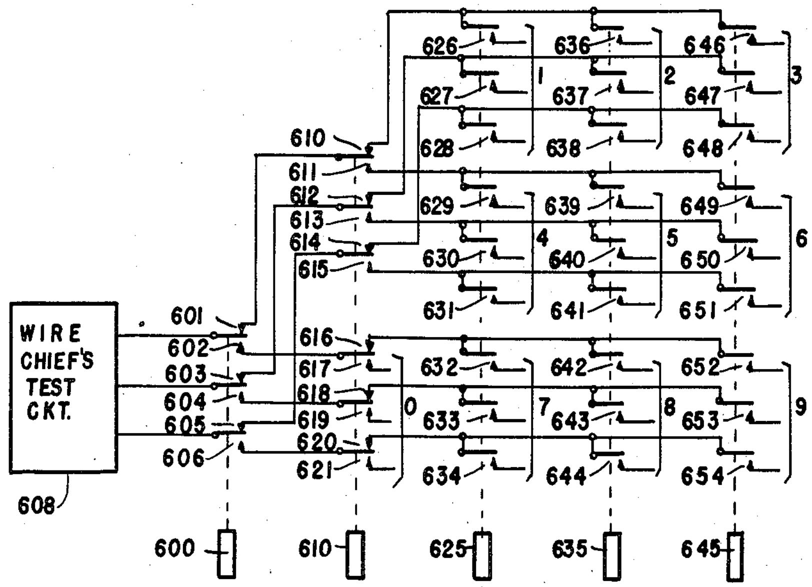
Figure 6 is a schematic representation of an alternative arrangement for the coordinate relay switching arrangement of the present invention.
Figure 7 is a chart useful in explaining the operation of the relay arrangement of Figure 6.

If it is desired to select one line out of ten, the arrangement shown in Figure 6 may be employed to great advantage. In this arrangement the ten lines are arranged in four columns, the first of which has one line and each of the remaining vertical columns has three. There is shown in the chart below an embodiment of the alternative line arrangement:

*Chart III*

| | | | |
|---|---|---|---|
| | 1 | 2 | 3 |
| | 4 | 5 | 6 |
| 0 | 7 | 8 | 9 |

As shown in Figure 6, the relay selection arrangement is under the control of five relays 600, 610, 625, 635 and 645. Relays 610, 625, 635 and 645 select a particular vertical column in which a desired line appears. Relay 610 has the dual function of selecting not only the vertical column in which one of the desired lines appears, but also of selecting two horizontal levels out of the three available in this arrangement. Relay 600 functions to select one of the two horizontal levels extended by relay 610.

A specific example may suffice to show the simplicity of the relay switching arrangement of Figure 6. Assuming that line 5 is the desired line, units key 5 will be connected to complete energizing circuits for relays 610 and 635. Upon operation, relay 635 at its contacts 636, 637, and 638 extends the three wires of line 2 to the contacts 610, 612 and 614 of relay 610; at its contacts 639, 640 and 641 extends the three wires of line 5 to the contacts 611, 613 and 615 of relay 610; at its contacts 642, 643 and 644 extends the three wires of line 8 to the contacts 616, 618 and 620 of relay 610.

Relay 610 operates, and at its contacts 610, 612, and 614, opens the circuit extending path for the three wires of line 2; at its contacts 611, 613 and 615 extends the three wires of line 5 to the contacts 601, 603 and 605 of relay 600; at its contacts 616, 618 and 620, opens the circuit extending path for the three wires of line 8, and at its contacts 617, 619 and 621 prepares a point in the extension path for the three wires of line 0. Since relay 600 is not operated under these circumstances, it is effective at its contacts 601, 603 and 605 to extend the conductors of the three wires of line 5 to utilization circuit 608 which may be the wire chief's test circuit 110, for example, and at its contacts 602, 604 and 606, interrupts the circuit extending path for the three wires of line 0. The selection of any other one of the ten lines available is accomplished by the action of any one or combination of relays of the arrangement in a manner obvious to those skilled in the art.

Consequently, as may be seen from the previous example, the relay switching arrangement of Figure 6 is a simplified version of a relay switching arrangement for the selection of one line out of ten.

The relays of the relay switching arrangement of Figure 6 which are operated to mark any selected line may be determined with reference to Figure 7 in which the left hand column indicates the number of the desired line and the columns beneath each relay contain X's to indicate the relay or relays operated to select the desired line. The circuitry involved in the operation of the desired relay or relays is apparent to those skilled in the art and the particular wiring necessary for their operation is not shown in detail.

While the specific embodiments herein shown illustrate a line selection arrangement utilizing relays controlled by manually operated keys, other arrangements may be substituted therefor without departing from the scope of the invention. Specifically, instead of relay contacts for extending the subscriber lines individually to the test circuit, there may be used vacuum tubes, gas filled tubes or transistors utilizing voltage divider arrangements to accomplish the same function. Since these latter circuits are well known, those skilled in the art are aware of the circuitry involved and fuller exposition is not deemed necessary.

In summary, the present invention is directed toward a simple coordinate system for selecting one line out of a plurality of lines through the operation of one or more relays of two groups of relays, one group of relays controlling the vertical column selection and one or more relays of the second group controlling the horizontal row selection in which the desired line appears. As an additional feature of the present invention, a novel relay switching arrangement is shown in which one of a plurality of ten lines may be selected through the use of vertical and horizontal coordinate selection relays arranged in a manner requiring a minimum amount of space.

These and other features of the invention which are believed to be new are set forth in the accompanying claims.

What is claimed is:

1. An arrangement for selecting one line out of a plurality of lines comprising a plurality of lines arranged in subgroups to twenty lines each, each subgroup being arranged in a coordinate system of four rows and five columns so that each individual line of said subgroups is disposed in one of said rows and in one of said columns; means including a group of five relays operative to select the one of said columns in which said one line is disposed; and a second group of two relays for selecting from the rows of lines, the one of said rows in which said one line is disposed.

2. In a telephone system including one hundred subscriber lines and selector means having ten outgoing paths for extending connections to subscriber lines, a line selecting system for selecting one line out of a plurality of one hundred and ten lines, comprising five subgroups of twenty lines and one subgroup of ten lines arranged in a coordinate pattern of rows and columns, each of said subscriber lines being connected to a corresponding one of said one-hundred lines and each of said outgoing paths of said selector means being connected to a corresponding one of said lines of said ten line subgroup, a first group of relays operative to select the one of said columns which includes said one line; a second group of relays, and means controlled by operation of the relays of said second group to select the one of said rows in which said one line appears, whereby said line is marked for extension to a utilization circuit.

3. In a line test circuit for use in an automatic telephone exchange, an arrangement for selecting one line out of a plurality of lines and extending same to a test circuit comprising means for extending said lines to a contact tree arranged in a coordinate system of rows and columns so that each individual line of said plurality as extended is disposed in one of said rows and in one of said columns; a first group of relays operative to select the one of said columns in which said one line is disposed; a second group of relays for selecting the one of said rows in which said one line is disposed, and means for coupling said selected line to said test circuit whereby a series of tests may be performed on the selected line.

4. A line test circuit arrangement as set forth in claim 3 in which said coupling means includes a test key having two positions, in one of which monitoring of said selected line is accomplished and in the other of which, dialing impulses may be sent out over said line for testing purposes.

5. An arrangement for selecting one line out of a plurality of lines comprising a plurality of lines arranged in a coordinate system of three rows and four columns so that each individual line of said plurality is disposed in one of said rows and one of said columns; a group of relays operative to select the one of said columns in which said one line is disposed, means controlled by one of said relays for selecting two of said three rows including the row in which said one line is disposed, at least one other relay, and means controlled by said other relay for selecting the one of said rows in which said one line is disposed.

6. An arrangement for selecting one line out of a plurality of lines arranged in a coordinate system of rows and columns with each individual line of said plurality disposed in one of said rows and in one of said columns comprising a first group of relays operative to select the one of said columns in which said one line is disposed; a second group of relays; means controlled by the members of said second relay group in combination to select the one of said rows in which said one line is disposed, and key means having contacts for preparing energizing circuits for said first and second groups of relays in a selective manner.

7. An arrangement for selecting one line out of a plurality of lines arranged in a coordinate system of rows and columns with each individual line of said plurality disposed in one of said rows and in one of said columns comprising a group of relays operative to effect selection of the one of said columns in which said one line is disposed; a second group of relays; means controlled by said second relay group in combination to effect selection of the one of said rows in which said one line is disposed; a first and second groups of keys having contacts for selectively preparing energizing circuits for the relays of said first and second groups, the energizing circuits for the relays of said first group each being controlled by the contacts of at least one of said keys of said first group in combination with the contacts of one of said keys of said second group and the energizing circuits for the relays of said second group being controlled by the contacts on said second group of keys.

8. An arrangement for selecting one line out of a plurality of lines arranged in a coordinate system of rows and columns with each individual line of said plurality disposed in one of said rows and in one of said columns comprising a group of relays operative to select the one of said columns in which said one line is disposed; a second group of relays; means controlled by the relays of said second relay group in combination to select the one of said rows in which said one line is disposed, and a first and second group of keys having contacts for preparing energizing circuits for the selected ones of said first and second groups of relays, the contacts of one of said first group of keys being operative in combination with the contacts of one of said second group of keys to energize a selected relay of said first group of relays, and the contacts of one of said second group of keys being operative to energize all the relays of said second group of relays, at least one of said relays of said second group being energized through the combination of the contacts of one of said first and one of said second groups of keys.

9. An arrangement for selecting one line out of a plurality of lines arranged in a coordinate system of rows and columns with each individual line of said plurality disposed in one of said rows and in one of said columns comprising a group of relays operative to select the one of said columns in which said one line is disposed; a second group of relays operative to select the one of said rows in which said one line is disposed, and a first and a second group of keys having contacts for selectively preparing energizing circuits for said first and second groups of relays; each key of said first group having two operating positions, one of said first group of keys operative in each position in combination with one of said second group of keys to energize a selected one of said first group of relays, and one of said second group of keys being operative to energize a selected relay of said second group of relays, whereby said line is marked for extension.

10. In an arrangement for selecting one line out of a plurality of lines arranged in a coordinate system of at least four rows and a predetermined number of columns with each individual line of said plurality disposed in one of said rows and one of said columns, a twenty point relay switching arrangement comprising a number of relays consistent with the number of columns, each of which is operative to effect selection of a corresponding one of said columns, means for controlling said relays to select the column in which said one line is disposed; a group of two relays, and means controlled by said two relays, in combination, to select the one of said rows which includes said one line.

11. In an arrangement for selecting one line out of a plurality of lines arranged in a coordinate system of rows and columns with each individual line of said plurality disposed in one of said rows and one of said columns, a relay switching arrangement comprising three relays operative to select the one of said columns in which said one line is disposed; a group of two relays, and means controlled by said two relays, in combination to select, the one of said rows which includes said one line.

12. In an arrangement for selecting one line out of a plurality of lines arranged in a coordinate system of rows and columns with each individual line of said plurality disposed in one of said rows and one of said columns, a relay switching arrangement comprising two subgroup switching arrangements, each of said subscriber switching arrangements including a number of columns containing an equal number of said lines and at least one column having a lesser number of said lines, said subgroup switching arrangements being mutually disposed so that said column having the lesser number of lines of one of said relay arrangements is disposed to form a common column with said corresponding column of said other subgroup switching arrangement, a first group of relays operative to select the one of said columns in which said one line is disposed; and a second group of relays for selecting the one of said rows which includes said one line.

13. A line selecting arrangement including a plurality of groups of lines, each of which groups is arranged in a coordinate system of rows and columns with each line of a group disposed in one of said rows and one of said columns, a plurality of column selection members for each group of lines, each member of the group being operative to select a corresponding one of said columns, means operative responsive to receipt of a signal indicating the group of the desired line to prepare for operation a plurality of the column selection members for the columns which include a line in the group, row selection means for selecting the row of the desired line, and means for thereafter controlling operation of the proper one of the prepared column selection members and said row selection means to select the desired line.

14. A line selecting arrangement including at least one group of lines, each group being divided into subgroups which are arranged in a coordinate system of rows and columns with each line disposed in one of said rows and one of said columns, each subgroup having its lines in at least two different columns, column selection members operative responsive to receipt of a signal indicating the subgroup location of the desired line to prepare for operation the column selection members for each of the columns having a member of the group therein, row selection means for selecting the row of the desired line, and means for thereafter controlling operation of both the proper one of the prepared column selection members and said row selection means to effect selection of the desired line.

15. An arrangement for selecting one line out of a plurality of groups and subgroups of lines, each of which groups is arranged in a coordinate system of rows and columns with each line disposed in one of said rows and one of said columns, the lines of a subgroup being located in different columns; a plurality of column selection members for each group of lines, each member being operative to select a corresponding one of said columns, means operative responsive to receipt of a signal indicating the group and subgroup of the desired line to prepare for operation the column selection member for each column which includes a line of the indicated group and subgroup, row selection means for selecting the row of the desired line, and common control means for thereafter effecting operation of the column selection member for the column including the desired line and said row selection means to select the desired line.

16. An arrangement for selecting one line out of a plurality of groups of lines which are subdivided into sets of ten and assigned a corresponding numerical designation, each group being arranged in a coordinate system of rows and columns with each line of a group disposed in one of said rows and one of said columns, different lines of each set of ten lines being located in different columns, a plurality of column selection members, each of which is operative to select a corresponding one of said columns, means operative responsive to receipt of a signal indicating the group and tens set of the desired line to prepare for operation the column selection members for the ones of the columns which include a member of the indicated tens sets, row selection means, and means for effecting operation of the proper one of the prepared column selection members and the row selection means to select the desired line.

17. An arrangement for selecting one line out of a plurality of groups of lines, each of which lines has an assigned tens and units digit, the lines of each group being arranged in a coordinate system of rows and columns with each line of a group disposed in one of said rows and one of said columns, each ten line set having lines in different ones of the columns, a plurality of column selection members for each group of lines, each member of the group being operative to select a corresponding one of said columns, means operative responsive to receipt of a signal indicating the tens digit of the desired line to prepare for operation the ones of said column selection members which are associated with columns having lines of the indicated tens set therein, row selection means for selecting the row of the desired line, and means operative with receipt of signals indicating the assigned units digit of the desired line to complete a circuit for the proper one of the prepared column selection members and said row selection means to select the desired line.

18. An arrangement for selecting one line out of a plurality of groups of lines, which are arranged in a coordinate system of rows and columns with each line of a group disposed in one of said rows and one of said columns, each of said lines being assigned at least a predetermined tens and units designator digit, certain of said columns having lines of different tens designations therein; a plurality of column selection members for each group of lines, each member of the group being operative to select a corresponding one of said columns, means operative responsive to receipt of a signal indicating the tens designator of the desired line to prepare for operation the column selection members for the columns which include members of the indicated set of ten lines, the members for said certain columns being therefore operated with receipt of different tens designators, row selection means for selecting the row of the desired line, and means for thereafter controlling operation of the proper one of the prepared column selection members and said row selection means to select the desired line.

References Cited in the file of this patent

UNITED STATES PATENTS

| | | |
|---|---|---|
| 2,410,304 | Powell | Oct. 29, 1946 |
| 2,572,266 | Jones | Oct. 23, 1951 |